C. NIELSEN.
Vehicle Spring.

No. 166,291. Patented Aug. 3, 1875.

WITNESSES:
A. W. Almqvist
A. F. Terry

INVENTOR:
Christen Nielsen
BY
ATTORNEYS.

UNITED STATES PATENT OFFICE.

CHRISTEN NIELSEN, OF SOUTH BROOKLYN, NEW YORK.

IMPROVEMENT IN VEHICLE-SPRINGS.

Specification forming part of Letters Patent No. 166,291, dated August 3, 1875; application filed May 15, 1875.

*To all whom it may concern:*

Figure 1:
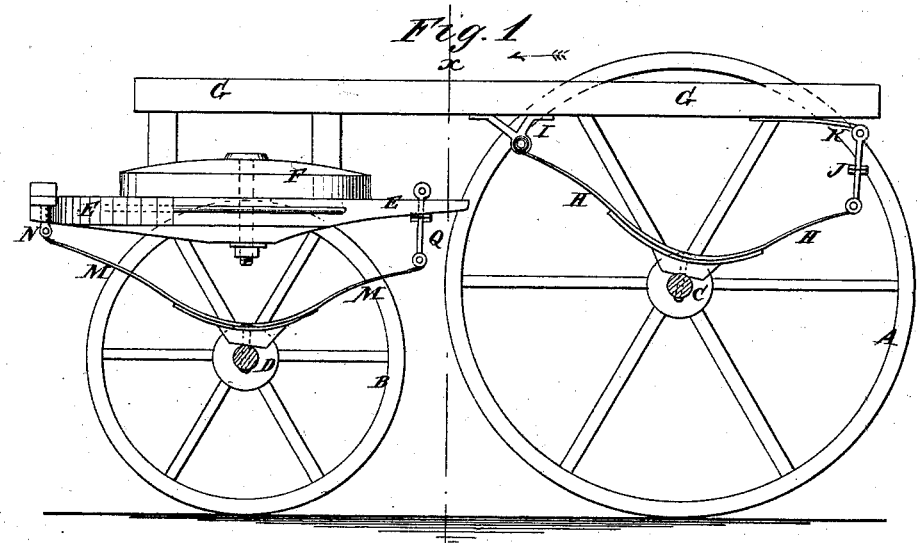
Figure 2:
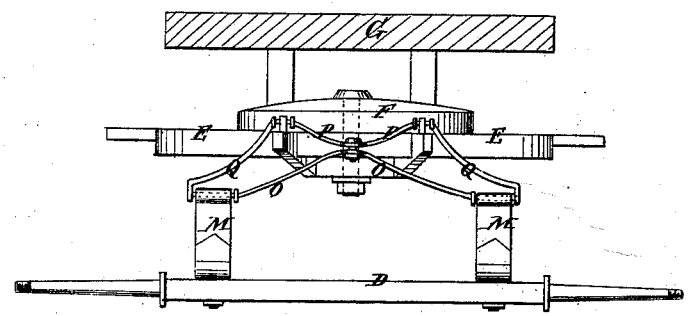
Figure 3:
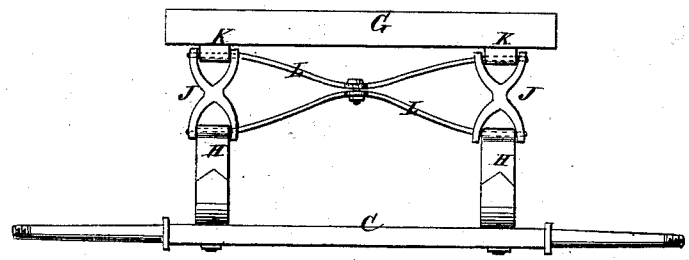

Be it known that I, CHRISTEN NIELSEN, of Brooklyn, in the county of Kings and State of New York, have invented a new and useful Improvement in Spring-Bars for Platform-Wagons, of which the following is a specification:

Figure 1 is a side view of a wagon to which my improvement has been applied, the near wheels being removed. Fig. 2 is a vertical section of the same taken through the line *x x*, Fig. 1, showing the front bars. Fig. 3 is a rear view of the same, showing the rear bar.

Similar letters of reference indicate corresponding parts.

The invention will first be described in connection with drawing, and then pointed out in the claim.

A represents the rear wheels, B represents the forward wheels, C the rear axle, D the forward axle, E the platform, F the fifth-wheel, and G the body, of the wagon about the construction of which parts there is nothing new. H are the rear springs, which are attached to the rear axle C, and their forward ends are pivoted to brackets I attached to the under side of the wagon-body G. To the rear ends of the springs H are pivoted the lower ends of the links or double U shackles J, the upper ends of which are pivoted to brackets or eye-straps K attached to the wagon-body G. The shackles or couplings J allow the springs H to expand as they are brought under the pressure of the load. The couplings J are kept parallel with each other to keep the springs H from being twisted when brought under the pressure of the load by one or more brace-bars, L. When two bars, L, are used, their ends are connected with the ends of the couplings J, and their middle parts are brought together, have holes or eyes formed in them, and are connected by a bolt, upon which the said bars work slightly when there is more weight upon one side of the wagon-body than upon the other. When a single brace-bar, L, is used, it should be connected with the lower ends of the couplings J. A cross-spring may be used in connection with the couplings J and brace L, if desired. M are the forward springs, which are connected with the forward axle D, and the forward ends of which are pivoted to brackets or eye-straps N attached to the forward part of the platform E. The rear ends of the springs M are connected by a bar, O, the middle part of which is bent upward, and has a hole or eye formed in it to receive a bolt, which also passes through a hole or eye formed in the bent-down middle part of the bar P. The ends of the bar P are pivoted to the rear ends of the bars of the platform E and to the ends of the bars Q, the other ends of which are pivoted to the outer sides of the rear ends of the springs M. The bars O P Q Q thus form a pivoted connection or coupling, and at the same time a brace for the rear ends of the spring M, to allow them to expand and prevent them from being twisted when brought under the pressure of a load.

Having thus described my invention, I claim as new and desire to secure by Letters Patent—

1. The combination, with rear springs H, of brackets I, shackles J, eye-straps K, and brace-bars L, all arranged substantially as and for the purpose specified.

2. The combination, with front springs M, of bars O P Q, serving both as coupler and brace, as set forth.

CHRISTEN NIELSEN.

Witnesses:
JAMES T. GRAHAM,
T. B. MOSHER.